(12) United States Patent
Sameshima et al.

(10) Patent No.: US 7,331,059 B2
(45) Date of Patent: Feb. 12, 2008

(54) ACCESS RESTRICTION CONTROL DEVICE AND METHOD

(76) Inventors: Shigetoshi Sameshima, c/o Hitachi, Ltd., Intellectual Property Group, New Marunouchi Bldg. 5-1, Marunouchi 1-chome, Chiyoda-ku, Tokyo 100-8220 (JP); Katsumi Kawano, c/o Hitachi, Ltd., Intellectual Property Group, New Marunouchi Bldg. 5-1, Marunouchi 1-chome, Chiyoda-ku, Tokyo 100-8220 (JP); Hiromitsu Kato, c/o Hitachi, Ltd., Intellectual Property Group, New Marunouchi Bldg. 5-1, Marunouchi 1-chome, Chiyoda-ku, Tokyo 100-8220 (JP); Takeshi Miyao, c/o Hitachi, Ltd., Intellectual Property Group, New Marunouchi Bldg. 5-1, Marunouchi 1-chome, Chiyoda-ku, Tokyo 100-8220 (JP); Toshihiko Nakano, c/o Hitachi, Ltd., Intellectual Property Group, New Marunouchi Bldg. 5-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 758 days.

(21) Appl. No.: 10/301,833

(22) Filed: Nov. 22, 2002

(65) Prior Publication Data

US 2004/0030915 A1 Feb. 12, 2004

(30) Foreign Application Priority Data

Feb. 21, 2002 (JP) ............................. 2002-044113

(51) Int. Cl.
*G06F 7/04* (2006.01)
*G06F 7/58* (2006.01)
*G06F 15/16* (2006.01)
*H04L 9/32* (2006.01)
*G06K 9/00* (2006.01)

(52) U.S. Cl. ................................. 726/7; 726/2; 726/27
(58) Field of Classification Search ................ None
See application file for complete search history.

(56) References Cited

U.S. PATENT DOCUMENTS 5,999,978 A * 12/1999 Angal et al. ................ 709/229

(Continued)

OTHER PUBLICATIONS

"Object Management Group", CORBA Security Service: Common Object Service Specification, CORBA Security Dec. 1995, Document No. 95-12-1.

Primary Examiner—Christopher Revak
Assistant Examiner—Arezoo Sherkat
(74) Attorney, Agent, or Firm—Mattingly, Stanger, Malur & Brundidge, P.C.

(57) ABSTRACT

In providing services in an environment in which apparatuses constituting a system change dynamically, flexible control of access control is performed for the apparatuses whose access rights and service providing policies are different or have not been set beforehand. In a distributed system where computers each having a function of storing data and processing a program and a communication facility perform data exchange through a communication medium, and thereby perform processing, control of limiting an access to the system etc. is performed as a shared session that is established by synthesizing access rights and service providing policies owned by the apparatuses, and accesses to the apparatuses and provision of services are performed through the shared session, whereby the access rights and the services to be provided are controlled according to a configuration of apparatuses constituting the system.

23 Claims, 14 Drawing Sheets

U.S. PATENT DOCUMENTS

| | | | |
|---|---|---|---|
| 6,052,785 A * | 4/2000 | Lin et al. | 726/5 |
| 6,490,624 B1 * | 12/2002 | Sampson et al. | 709/227 |
| 6,577,597 B1 * | 6/2003 | Natarajan et al. | 370/232 |
| 6,785,728 B1 * | 8/2004 | Schneider et al. | 709/229 |
| 6,944,183 B1 * | 9/2005 | Iyer et al. | 370/466 |
| 2003/0004950 A1 * | 1/2003 | Wils et al. | 707/10 |
| 2005/0022027 A1 * | 1/2005 | Bonn et al. | 713/201 |

* cited by examiner

WIDE-AREA MONITORING AND CONTROLLING

SHARED APPARATUS USE SERVICE

FIG. 3(a)

APPARATUS STATUS TABLE

| CONSTITUENT MEMBER (311) | APPARATUS STATUS (312) | TASK STATUS (313) | UPDATE TIME (314) | |
|---|---|---|---|---|
| A | LIVE | MONITORING : LIVE | | 321 |
| B | LIVE | | | 322 |

FIG. 3(b)

ACCESS CONTROL TABLE

| MEMBER (331) | PERMISSION ENTRY LIST (332) | |
|---|---|---|
| A | 1, 2 | 341 |
| B | 2 | 342 |

| PERMISSION ENTRY (351) | PROVIDED SERVICE | | STATUS (354) | |
|---|---|---|---|---|
| | SUBJECT (352) | CONTENT (353) | | |
| 1 | x | OPERATION | | 361 |
| 2 | x | MONITORING | IN USE | 362 |
| 3 | y | MONITORING AND SETTING | | 363 |

APPARATUS STATUS MANAGEMENT PROCESSING

TRANSMISSION

RECEPTION

MESSAGE FORMAT

- 511 MESSAGE HEADER
- 512 MESSAGE TYPE
- 513 DESTINATION NODE
- 514 SENDER NODE
- 515 DATA
- 516 SHARED SESSION ID

EXAMPLE OF SERVICE REQUEST MESSAGE

- 515 DATA
- 521 REQUEST
- 522 PARAMETER
- 523 PARTICIPATION POLICY

EXAMPLE OF STATUS MANAGEMENT MESSAGE

- 515 DATA
- 531 TASK IDENTIFIER
- 532 STATUS
- 533 ACCESS RIGHT LIST

FIG. 6(a)

IN THE CASE OF CONFERENCING MONITORING AND CONTROLLING

| SESSION ID | CONSTITUENT MEMBER | PARTICIPATION TYPE | PARTICIPATION POLICY | |
|---|---|---|---|---|
| 1 | A | R | OR | * |
| 1 | B | R | OR | * |
| 2 | A | R | | |

FIG. 6(b)

IN THE CASE OF EXCLUSIVE MONITORING

| SESSION ID | MEMBER | PARTICIPATION TYPE | PARTICIPATION POLICY | |
|---|---|---|---|---|
| | | | AUTHORITY PUBLICIZING TYPE | PUBLIC AUTHORITY |
| 1 | A | R | XOR | y.MONITORING, y.SETTING |
| 1 | B | R | OR | |

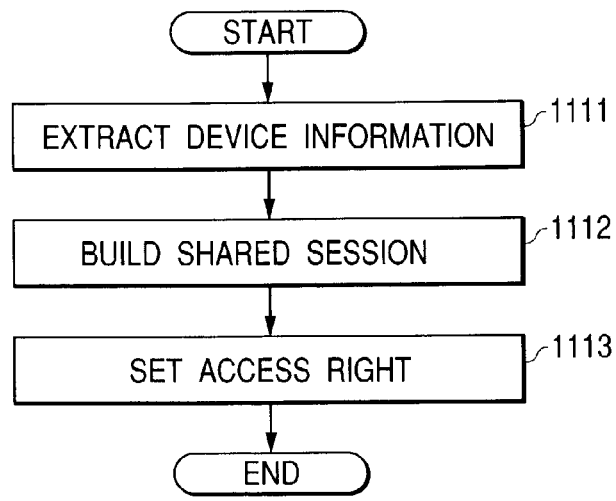

IN THE CASE WHERE SHARED RELATIONSHIP IS ESTABLISHED BY APPARATUS ID AND FUNCTION

IN THE CASE WHERE SHARED RELATIONSHIP IS ESTABLISHED BY NETWORK STRUCTURE IN WHICH INFORMATION PASSES THROUGH

IN THE CASE WHERE RELATIONSHIP IS ESTABLISHED BY APPLICATION LINKAGE

ACCESS RESTRICTION CONTROL DEVICE AND METHOD

BACKGROUND OF THE INVENTION

The present invention relates to a system for performing access control and provision of services, more specifically to an access control method that can accommodate a distribution system that enables operations of shared resources and reading of data, such as the provision of services and access to equipment in a wide-area distribution monitoring and control system and in public facilities.

With penetration of networks, such systems are increasing in number that provide data stored in equipment and a computer system and that provide services in response to an operation to the systems. As examples of such systems, there are enumerated a system for performing monitoring/controlling from a remote site and maintenance and an information providing service system that uses public terminals. In such systems, in order to control operations from a plurality of persons and prevent unauthorized data reading, it becomes essential to control accesses to the equipment and the computer system and restrict services to be provided.

As the conventional technology for restricting services, there are, for example, a method for limiting access sources by using an access control list, which is described in "Object Management Group, CORBA® Service: Common Object Service Specification, CORBA Security December 1995 Document Number 95-12-1", and a method for performing exclusive OR control to avoid competitive operations from a plurality of accessing persons. There is encryption as means for protecting unauthorized reading of data, and particularly encryption where operators are permitted to do the access, in addition to specific operators being permitted, under common agreement among a plurality of operators or consent of a supervisor. As a method for granting such permission, there is a secret distribution sharing method in which decoding of data is made possible only when there exist a plurality of permitted persons etc. This technology is described in "Secret Distribution Sharing Method," Modern Cryptography and Magic Protocol, separate volume of Mathematical Sciences, pp. 76-83, September 2000, SAIENSU-SHA Co., Ltd.

In the distributed system mentioned above, it is common that authorization/refusal of the operation of equipment is not determined statistically but the property may change according to dynamic factors such as the kinds of participants and a composition of the participants. For example, it is such a case as follows.

A case where a maker person in charge but without an access right is permitted for the access if a maintenance/recovery operation needs to be performed immediately.

A case where even a person having the access right is not permitted to access if a particular person having specific authority is not monitoring the access, as in cases where a trainee is permitted to perform operations under the monitoring of a trainer or where a maker person is permitted to perform maintenance only when a system administrator is monitoring it.

A case where, if a third person enters the system, the monitoring and operations are stopped.

Further, a configuration of a group of apparatuses that operate in cooperation with one another to provide a certain service may change. Moreover, an apparatus to be operated is often operated as a single constituent apparatus because the constituent apparatuses in the configuration are linked with one another in a network. At this time, it is required for the system to perform an exclusive OR control among a plurality of apparatuses sharing resources, such as hardware and a communication path, and to judge whether or not the service can be provided depending on the configuration of the group of apparatuses.

The above-mentioned conventional technology cannot cope with these situations suitably, and hence the following points become problems.

First, in the case where an access right list is changed at each time so that the access right is granted to a person who was not registered originally or the access right is set to an apparatus that underwent change in the configuration, registration of the access right etc. become complicated. On the other hand, a scheme where all operations are performed via a privileged person is beyond capability of the system.

Second, in the case where an authorized person list is modified temporarily by the privileged person and the privileged person forgets about recovering a normal setting or connection of the privileged person is interrupted, the list concerned is not maintained and hence the risk of being illegally accessed is increased. Thus, the conventional technology does not consider restriction of data reading that had been once permitted but has become otherwise when the service user apparatuses and the service providing apparatuses, which are participants, were dynamically changed.

Third, in the conventional technology in which an access control right is set for each of the service providing apparatuses, if the apparatuses have dependency with one another, it is difficult to judge whether the access control shall be done and whether the provision of services is permitted in consideration of these.

SUMMARY OF THE INVENTION

It is the object of the present invention to provide flexible access controlling means for controlling access between apparatuses that have different access rights and different policies with respect to the provision of services or whose rights and policies have not been defined beforehand in performing the access control and the provision of services in an environment in which the apparatuses constituting such a system are dynamically changed.

In the present invention, in order to achieve the above-mentioned object, a session that is shared among a plurality of apparatuses is established, each apparatus participates in the shared session with a policy of publicizing authority being set, a service such as monitoring and an operation is permitted by using the configuration of the participating apparatuses and the access right of each as a logical switch.

Therefore, the system has means for establishing the shared session, means for controlling a participating state to the shared session, and means for dynamically modifying permission/refusal of access on the basis of the participating state.

Further, the system has means for continuously monitoring the authority of the apparatus participating the shared session and a participating state thereof to the session such as permission/refusal of communication and for updating permission/refusal of access via the shared session.

Moreover, in order to realize this in a distributed environment, a shared session among a plurality of apparatuses is created.

Making the service user apparatuses share a session enables for originally unregistered persons to be granted the access right without making cumbersome registration. Moreover, monitoring continuously the configuration and status of the apparatuses enables for the access right to be maintained and for the illegal access to be precluded in cases where recovery of the normal setting is neglected or where connection of the privileged person is interrupted. Thus, flexible access controlling means that considers a plurality of participants can be provided.

Further, by building the shared session using the dependency of the service providing apparatus side, the access control based on availability of the apparatuses and resource contention can be performed. Moreover, also for the apparatus whose access right has not been set beforehand, it becomes possible to perform the access control using the access right of another subordinate apparatus.

BRIEF DESCRIPTION OF THE DRAWINGS

FIG. 3(A) shows an example of the composition of the apparatus status table 221 in the first embodiment of the present invention.

FIG. 3(B) shows an example of the composition of the access control table 222 in the first embodiment of the present invention.

FIG. 6(A) shows an example of the composition of a shared session table in conferencing monitoring and controlling in the first embodiment of the present invention.

FIG. 6(B) shows an example of the composition of a shared session table in exclusive OR monitoring in the first embodiment of the present invention.

FIG. 10 shows an example of the composition of a shared session table 223 in a second embodiment of the present invention.

FIG. 11 shows a flow of processing of the session building 232 in the second embodiment of the present invention.

DETAILED DESCRIPTION OF THE PREFERRED EMBODIMENTS

Hereinafter, the embodiments according to the present invention will be described. The following four examples will be explained, each example corresponding to a different subject on which conferencing is done in performing the access control and the provision of services.

(1) Conferencing Among Service User Apparatuses.

For example, the following access right synthesis and judgment on the provision of services are performed.

AND: If all users on respective service user apparatuses (hereinafter referred to as the "users" for simplicity) do not have the same right, the use of another apparatus to be given a service (hereinafter referred to as the "use" for simplicity) is not permitted.

OR: If any one of the users holds the right, the use is permitted.

XOR: If there is not any other user except one user, the use is permitted for that user. If there is any other user besides that user, the use is stopped for that user.

(2) Conferencing Among Service Providing Apparatuses.

For example, the following access right synthesis is performed.

AND: Only if there is an interface of another apparatus, the interface is made available.

XOR: The interface is made available in an exclusive OR manner with respect to an interface of another apparatus, that is, if there is an interface of another apparatus, the interface of its own is made not available.

Further, processing forms of this conferencing will be described for the following examples.

(3) All Distributed Apparatuses Control the Shared Session Among the Service User Apparatuses.

(4) All Distributed Apparatuses Control the Shared Session Among the Service Providing Apparatuses.

Figure 1A:
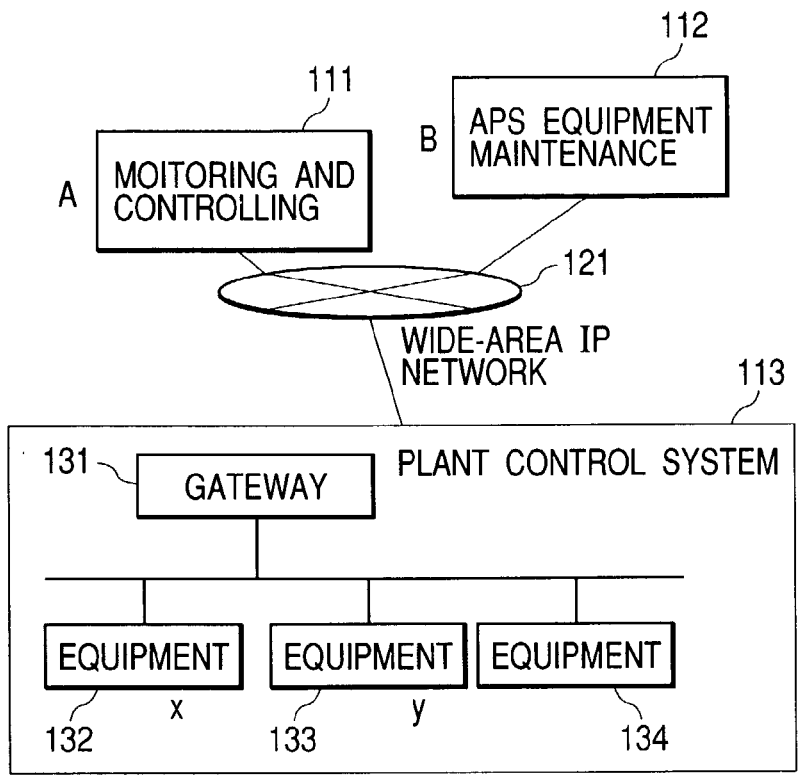
FIG. 1(A) shows an example of the configuration of a monitoring and control system in a wide-area environment to which the present invention is applied.

FIGS. 1(A) and (B) are views each showing an example of the configuration of a system to which the present invention is applied. FIG. 1(A) is a view showing an example of the configuration of a monitoring and control system in a wide-area environment, which is constituted of a group consisting of apparatuses 111-113 and a wide-area IP network 121. The apparatuses 111 and 112 are service using side apparatuses, respectively, and the group of apparatuses 113 is a plant control system for providing monitoring and controlling services. The apparatus 111 is a terminal where the monitoring and controlling of the plant control system 113 is performed, and the terminal 112 is a terminal that the user accesses in order to perform equipment maintenance of the plant control system 113. The plant control system 113 is constituted of the apparatuses 131-134, where pieces of equipment 132-134 are connected to the wide-area IP network 121 through a gateway 131 and are operated by the monitoring and controlling terminal 111 and the ASP equipment maintenance terminal 112. This example is found in a case where an equipment vendor performs remote maintenance of specific equipment of a plant control system using the apparatus 112.

Figure 1B:
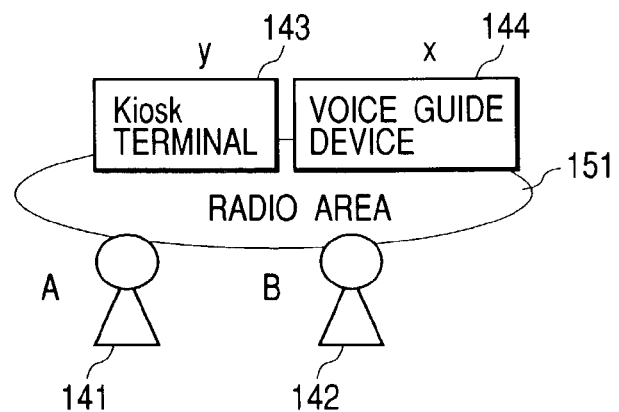
FIG. 1(B) shows an example of the configuration of a shared apparatus use service system to which the present invention is applied.

FIG. 1(B) shows an example of the configuration of a shared apparatus use service system, which is constituted of apparatuses 141-144 and radio equipment 151. The apparatuses 141 and 142 are service using side apparatuses, respectively, and are, for example, portable telephones and PDAS. A group of apparatuses 143-144 are apparatuses for providing services: a Kiosk terminal 143 is an apparatus for providing information and receiving user input, and an apparatus 144 is an apparatus for delivering audio output. These perform data exchange mutually by the radio equipment 151.

Each apparatus contains a processor with information processing capability and communication capability, and a certain apparatus acquires information of an environment and controls it through a sensor and an actuator. Computers 101-105 are connected with one another through a transmission medium 111, and a range in which entities are connected by this transmission medium is here called a peripheral. The transmission medium may be a cable such as a LAN cable and a twist pair cable or may be replaced with radio equipment such as an electric power saving radio and an infrared ray link.

The service using side apparatus provides data of a some sort to the service providing apparatus, while the service providing apparatus provides a suitable service to the service using side apparatus by using this. The apparatuses perform data exchange mutually through the transmission medium and processing of it. Moreover, each apparatus is identified with the use of a unique node identifier, such as an IP address, through the transmission medium, and identifies individual apparatuses using an individual identifier such as an apparatus ID. For the individual identifier, a log-in ID that is inputted by the user may be used, or the user ID stored in an IC card that the user inserted into the apparatus may be used in place of the log-in ID.

Figure 2:
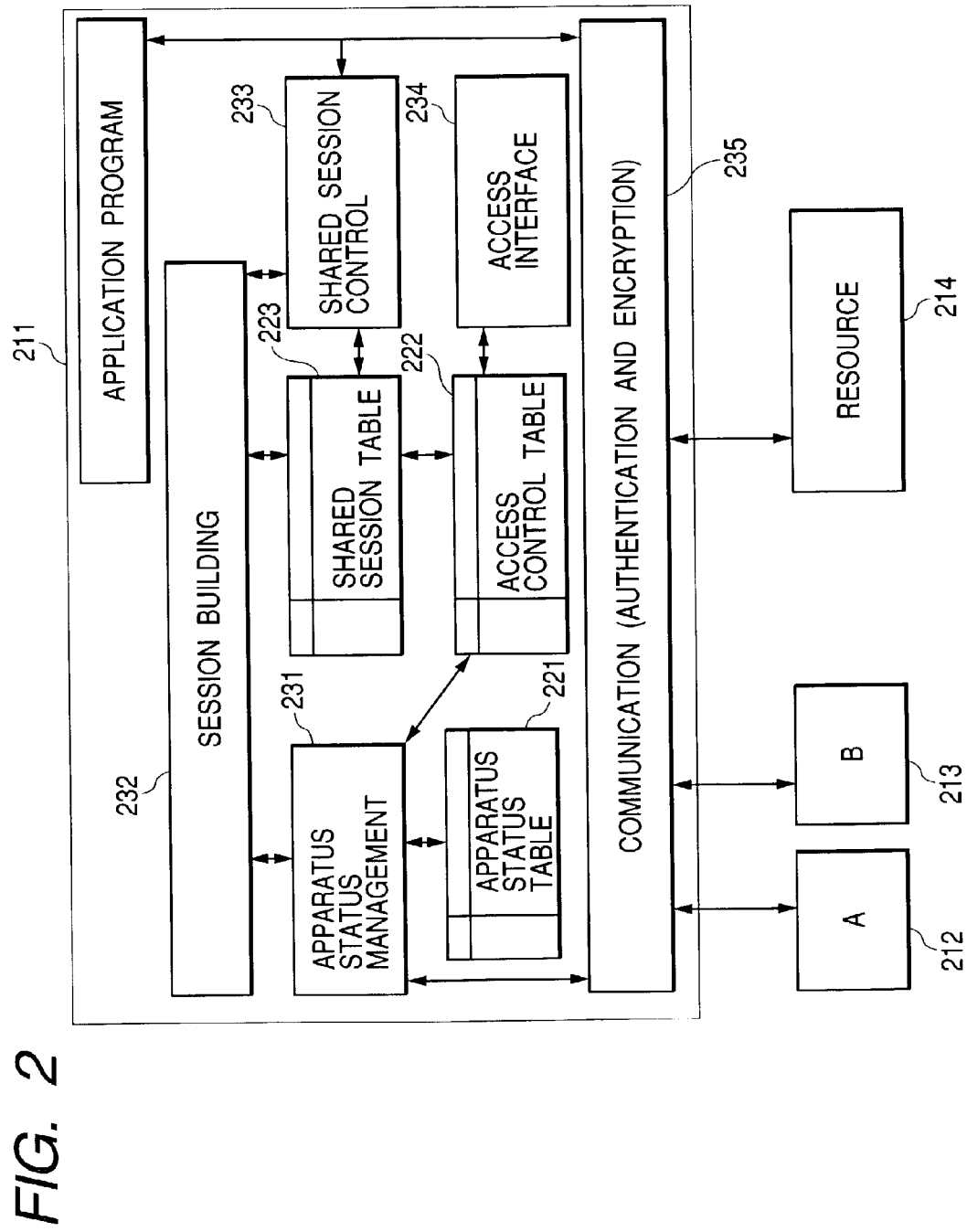
FIG. 2 shows details of an internal structure of the apparatus to which the present invention is applied.

FIG. 2 is a view showing a processing configuration of the apparatus to which the present invention is applied. The processing of this apparatus consists of the apparatus status management 231, session building 232, shared session management 233, access interface 234, and communication 235. The communication 235 is processing that performs data exchange with other apparatuses, in which the individual identifiers of the service using side apparatuses 212, 213 and of a service providing apparatus 214 are authenticated. The apparatus status management 231 is processing that manages: configurations of the apparatus from which the user have a service through the apparatus 211 and of the service providing apparatus; statuses of tasks that are application programs for these operations; and the access rights to these apparatuses, in such a way that these statuses are acquired through the communication 235 and are stored in the apparatus status table 221 and the access control table 222. The session building 232 is processing that builds the shared session based on change in status of apparatus received from the apparatus status management 231 and a request received from the shared session management 233. The shared session that was built is stored in a shared session table 223. The shared session management 233 is processing where a request from a service using side apparatus is received, and is collated with the shared session table to permit an access or to request the session building 232 to build the shared session. The access interface 234 is processing that synthesizes and manages the access rights to the apparatuses based on the access control table 222.

Each apparatus has a function of receiving person s input and delivering an output through an external input/output part thereof such as a sensor, an actuator, a camera, a liquid crystal panel, a key board, a touch panel. However, this is not essential and some apparatuses do not have the external input/output parts.

Embodiment 1

In Embodiment 1, an example where the access control and the provision of services are performed through conferencing of the apparatuses by which the user wishes to be given a service.

FIG. 3 (A) and (B) are views showing examples of the compositions of the apparatus status table 221 and of the access control table 222, respectively, in the first embodiment of the present invention. FIG. 3 (A) is a view showing an example of the composition of the apparatus status table 221. The apparatus status table 221 is constituted of fields 311-314. The field 311 is a field for storing constituent members, more specifically for storing the individual identifiers of the service using side apparatus or the service providing apparatus. The apparatus status 312 is a field for storing a status of the apparatus, more specifically for storing a communication status between the apparatus concerned and an apparatus that is controlled. That is, when the apparatus cannot communicate even if it is working, the apparatus is considered dead. The task status 313 is a field for storing a working status of an application of the service requesting side apparatus, or of the application program of the service providing apparatus. Each apparatus transmits a status acquired from the operating system etc. and an apparatus that received this stores it. In the update time 314, a newest time when the status of the apparatus shown in each record was acquired is stored. A record 321 indicates that the status of the apparatus of the individual identifier A is "LIVE" and a status of the task "MONITORING" working in the apparatus A is "LIVE." A record 322 indicates that the status of the apparatus of the individual identifier B is "LIVE."

FIG. 3(B) is a view showing an example of the composition of the access control table 222. The access control table 222 has two kinds of tables: a table constituted of a member 331 and a permission entry list 332; and a table constituted of a permission entry 351, a provided service subject 352, a provided service content 353, and status 354.

(b) In the member 331, as with the constituent member 311 of the apparatus status table 221, the individual identifier of the apparatus is stored. Here, the member 331 is the individual identifier of the service using side apparatus. In the permission entry list 332, a link to a record for indicating access permission to each apparatus is saved and a list of the permission entry 351 is stored. The permission entry is a unique record identification number. The provided service target 352 indicates the individual identifier of the service providing apparatus, and the provided service content 353 indicates an interface that is opened by the service providing apparatus or by an application program of the service providing apparatus. The status 354 indicates whether the interface concerned is presently used by any one of the apparatuses. A record 341 indicates that on the apparatus A, the services specified by the permission entries 1 and 2 are available. The contents of the permission entry 1 are stored in a record 361, which indicates that an "operation" interface of the apparatus X is available. The contents of the permission entry 2 are stored in a record 362, which indicates that a "monitoring" interface of the apparatus X is available. A record 342 indicates that on the apparatus B, the service specified by the permission entry 2 is available.

Figure 4A:
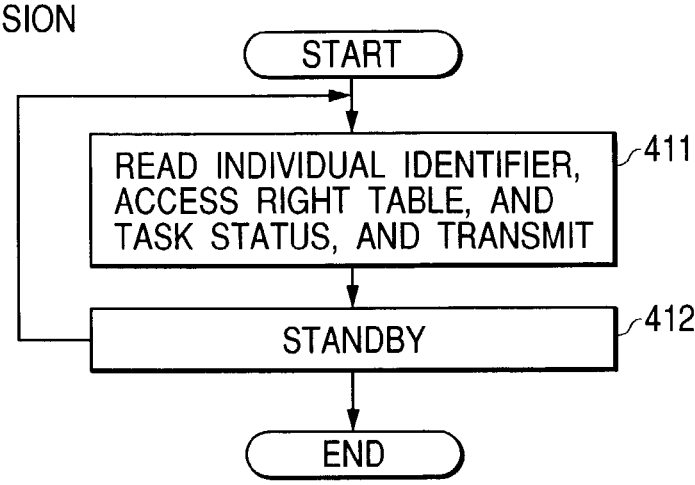
FIG. 4(A) is a diagram showing a flow of processing of Push type transmission of the apparatus status management 231.

FIGS. 4(A) and (B) are diagrams each showing a flow of processing of the apparatus status management 231. FIG. 4(A) is a diagram showing a flow of processing of Push type transmission. Here, the Push type indicates transmission in which each apparatus transmits information of its own spontaneously using, for example, the heartbeat message. This processing consists of the following two steps. The status of the application program at work is read in from the individual identifier of a service requesting apparatus, the access right table, the operating system, etc. and is sent to a common transmission medium to which that apparatus belongs (Step 411). Note that broadcast or multicast may be used without specifying a transmission destination. Alternatively, the status may be transmitted to a specified apparatus. Further alternatively, the status may be transmitted to an apparatus that is performing a session control that will be described later. After that the flow stands by for a specified time (Step 412) and then repeats Step 411 again.

Figure 4B:
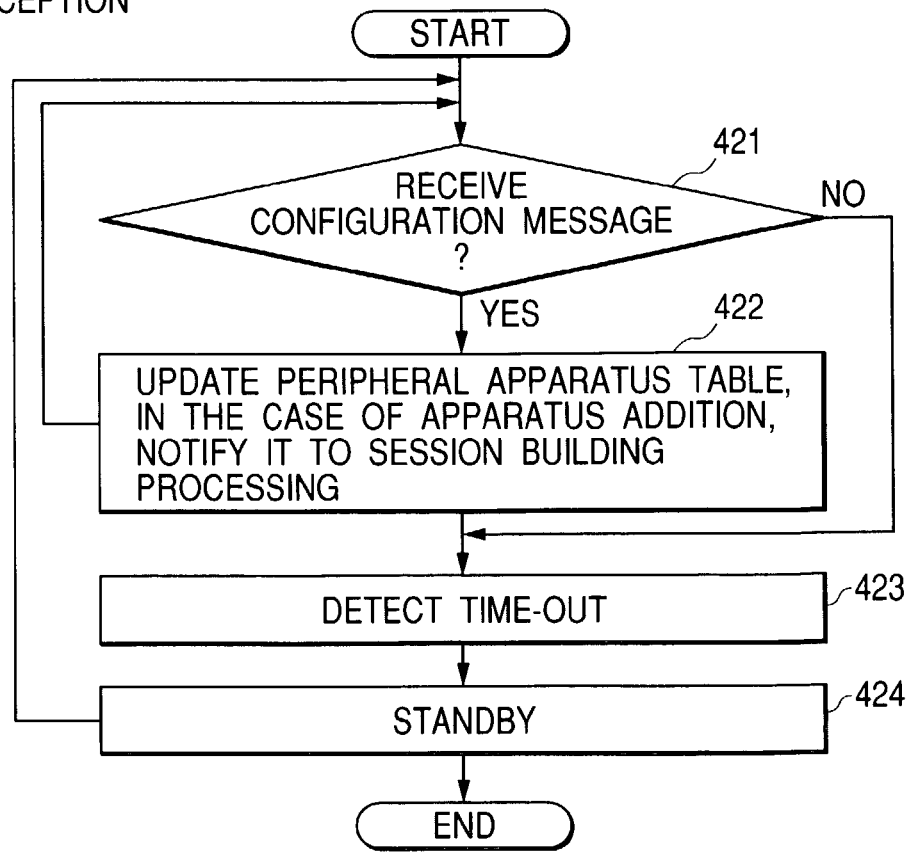
FIG. 4(B) is a diagram showing a flow of processing of Push type reception of the apparatus status management 231.

FIG. 4(B) is a diagram showing a flow of processing of Push type reception. When the apparatus has received the configuration that was transmitted by the transmission processing shown in FIG. 4(A), this information is taken out (Step 421) and the apparatus status table 221 is updated with it. If there is a newly added apparatus, the fact is notified to the session building 232 (Step 422). If there is not a newly added apparatus in the received message of the configuration, a peripheral apparatus table is searched and an apparatus that went time-out is detected. Here, the time-out detection is to detect, for example, an apparatus indicated by a record that has passed a certain time from the update time 314. After that, the flow stands by for a certain time (Step 424), and then repeats Step 421 again.

Note that, in this embodiment, an example of the push type transmission where each apparatus transmits the information of its own spontaneously, but a scheme in which each apparatus sends an inquiry to other apparatuses and acquires information of those apparatuses may be adopted. Further, the monitoring of the constituent members may be done for IC cards and tags.

Figure 5A:
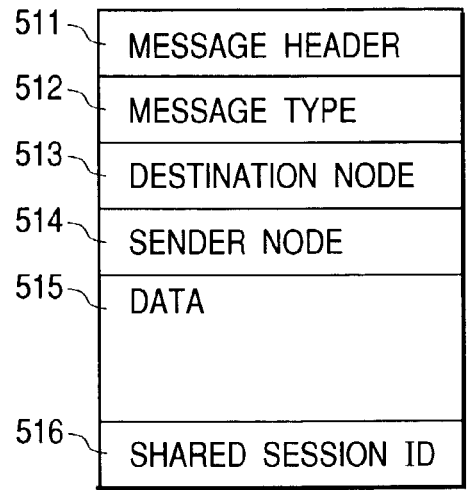
FIG. 5(A) shows the composition of a message that is transmitted and received between computers in the present invention.

FIGS. 5(A), (B), and (C) are views showing an example of the composition of the message data that is transmitted and received between computers in the present invention. FIG. 5(A) is a view showing the composition of a message, which is constituted of a message header 511, a message type 512, a destination node 513, a sender node 514, data 515, and a shared session ID 516. The header 511 is a header that stores various identifiers for communication processing, and data including encryption of the message, a signature used for preventing falsification, etc. is stored therein. In the destination node 513, a unique identifier of the destination apparatus is stored, and in the sender node 514, a unique identifier of the sender apparatus is stored. The destination node 513 is capable of storing a plurality of destination nodes. Here, by assigning an address of a network segment to the destination node 513, the message can be used as a broadcast message to the network segment. Further, in the case where radio is used, the message is used as broadcast to a region where the radio wave can reach by specifying nothing, and the message is used as a message to be broadcast in a cell; in the case where the cell is specified by abase station, by specifying the cell number. In the message type 512, the identifiers indicating types of the message, such as a type of a data public message for reception of service data (service request) and a type of an interface to be accessed according to the message, are stored. In the data 515, the contents of the data to be transmitted is stored: more specifically, the public data is stored at the time of opening data for reception of the service data, and the contents of the service data is stored at the time of transmitting the service data.

Figure 5B:
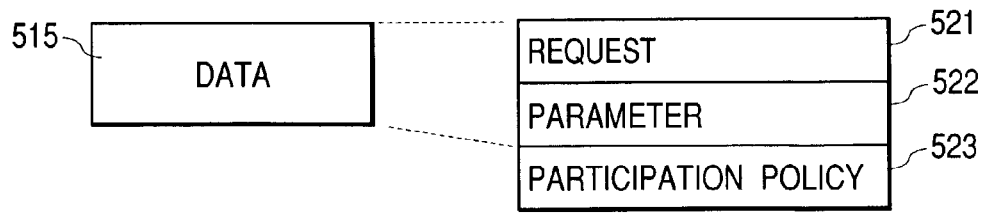
FIG. 5(B) shows an example of the composition of a message for transmitting a request invoked by the service using side.

FIG. 5(B) is a view showing an example of the composition of a message for transmitting a request invoked by the service using side. A field 521 stores an interface identifier of the application program that the user wishes to use, and a field 522 stores parameters of the request. A field 523 stores a participation policy when the service is used. The participation policy will be described later referring to FIG. 6. Note that here described is an example of a case where the participation policy is explicitly transmitted, but the participation policy may be set as default beforehand and no participation policy may be set in this message.

Figure 5C:
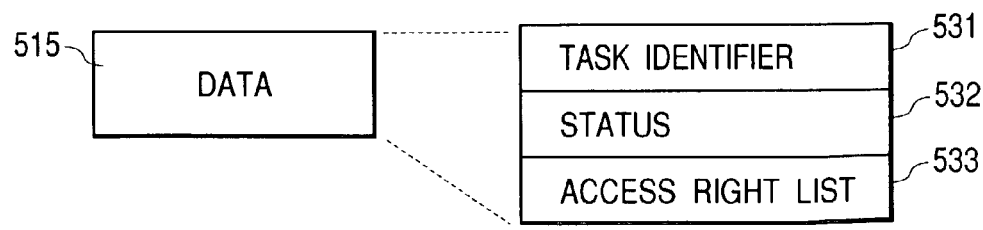
FIG. 5(C) shows an example of the composition of an apparatus status management message.

FIG. 5(C) is a view showing an example of the composition of an apparatus status management message. Fields 531, 532 store the identifier and the status of a task, respectively, and these are repeated for the number of tasks. A field 533 stores an access right list. The data consisting of the fields 531, 532 multiplied by the number of tasks plus the field 533 is transmitted.

FIGS. 6(A) and (B) are views each showing an example of the composition of the shared session table in the first embodiment of the present invention. FIG. 6(A) is a view showing an example of the composition of this table, namely an example of setting in the conferencing monitoring and controlling. The shared session table 223 is constituted of fields 611-615. The field 611 is a field for storing the session ID, which is defined and updated by the session building 232. The constituent member 612 is a field for storing the constituent members of the session. The authority publicizing type 613 of participation policy is a field for storing a form in which its own authority is opened to other users. In this field, for example, the following types are stored.

AND: If all users do not have the same right, the use is not permitted.

nAND: If n users have the same right, the use is permitted.

OR: If any one of the users has the right, the use is permitted.

XOR: If there is no user except one user, the use is permitted to that user.

If there is any other user, the use becomes not permitted to that user.

In public authority 614 of participation policy, authority that is opened in a form specified in the authority publicizing type 613 is stored. In participation type 615, information as to whether the constituent member indicated in each record is participating the session concerned as the user or as a service provider is stored. For example, the user is identified by "R" and the provider is identified by "P." The record 621 indicates that a member apparatus A participating in a session of a session ID1 does so with a participation type "R," that is, as a service user, with an authority publicizing type "OR," and with "*," that is, being to open full authority owned by the apparatus A. The record 622 indicates similarly that an apparatus B participating in a session ID1 does so with an authority publicizing type "R," and with "*," that is, being to open full authority. At this time, the apparatus A and the apparatus B both participating the session ID1 share mutual access rights. For example, it is indicated that the apparatus B will have the access right owned only by A and not owned by B.

FIG. 6(B) is a view showing an example of setting of the exclusive OR monitoring, namely "XOR" type monitoring. The record 631 indicates that a member apparatus A participating in a session ID1 does so with an authority publicizing type "XOR," and being to open a "monitoring" interface of an apparatus Y and a "setting" interface of the apparatus Y out of authority owned by the apparatus A. The record 632 indicates similarly that the apparatus B participating the session ID1 is to open its authority in an authority publicizing type "OR." When there is not the record 632, that is, only the apparatus A participates the session ID1, the, apparatus A has the authority to use the "monitoring" and "setting" interfaces of the apparatus Y, but when the apparatus B that is another member participates the session ID1, the apparatus A loses the authority to do so. This is, for example, a case where, when one user views personal contents using the shared apparatus 143 in the shared apparatus use service that was explained in FIG. 1(B), if another user tries to read this, reading of the contents is stopped for that one user.

Although in this embodiment the example where the authority publicizing type is specified for each apparatus and for each session ID, the authority publicizing type may be specified in detail for each accessible interface.

Figure 7:
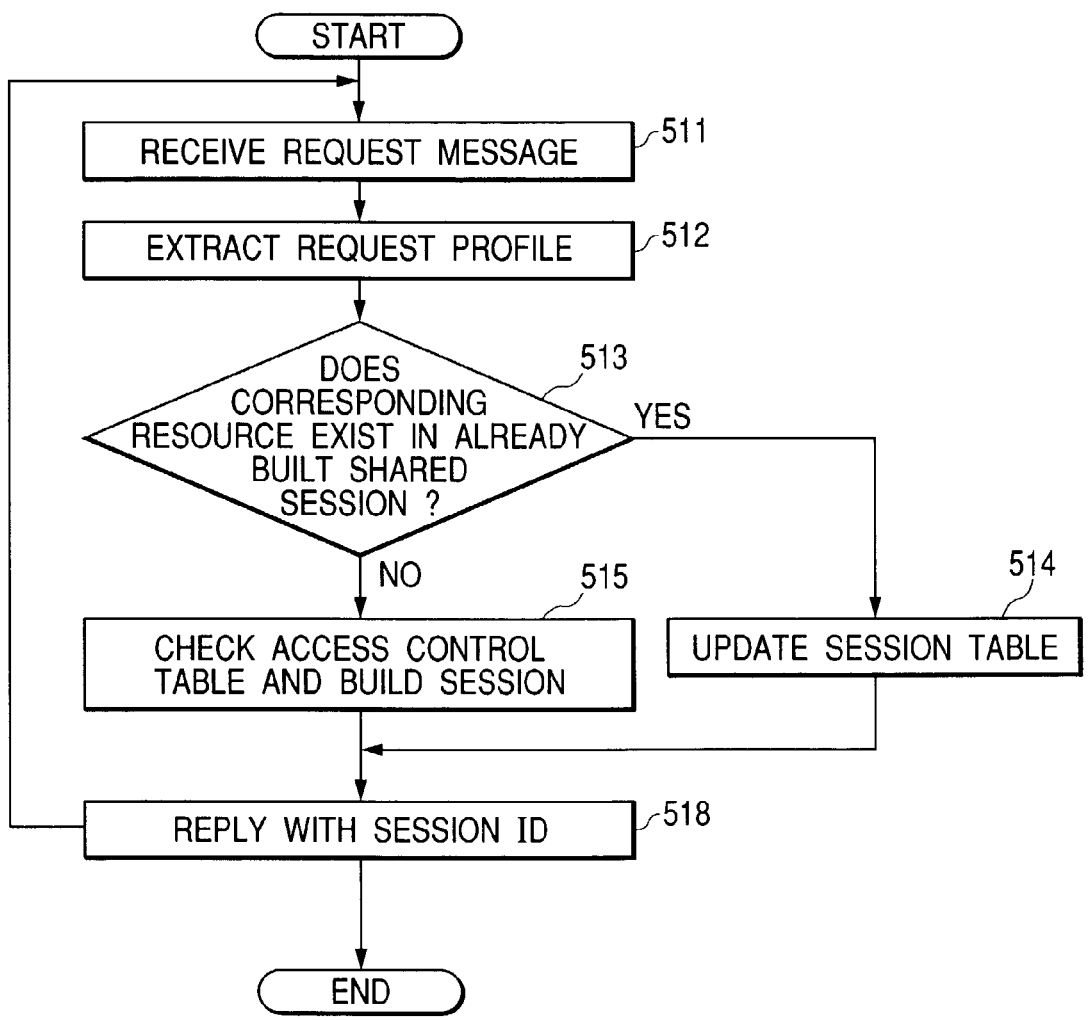
FIG. 7 shows a flow of processing of a session building 232.

FIG. 7 is a diagram showing a flow of processing of the session building 232. When a request from the shared session management 233 is received (Step 511), an interface that is intended to be accessed by the request is extracted (Step 512). Next, the shared session table 223 is searched, it is checked whether there is a corresponding resource in the shared session that has already been built (Step 513), and if there is the resource, a record is added in the shared session table 223 and a set of the request source node and the session is stored (Step 514). If there is not the resource, the access control table 224 is searched, and then if the access right has been set, a new shared session ID is assigned, and a record is added in the shared session table 223(Step 514). After these operations, the session ID is sent back to the request source (Step 518).

In the example of the flow of this processing, a case where all apparatuses are added to the existing shared session was illustrated, but a case where information that the apparatus concerned is to be added or not is described in a request message and the judgment as to whether or not the apparatus is added is made by using this. Further, a suitable session may be selected interactively according to the kinds of and the number of the constituent apparatuses in the shared session. Alternatively, the apparatuses may be made to participate all shared sessions without specifying a specific interface to access.

Figure 8:
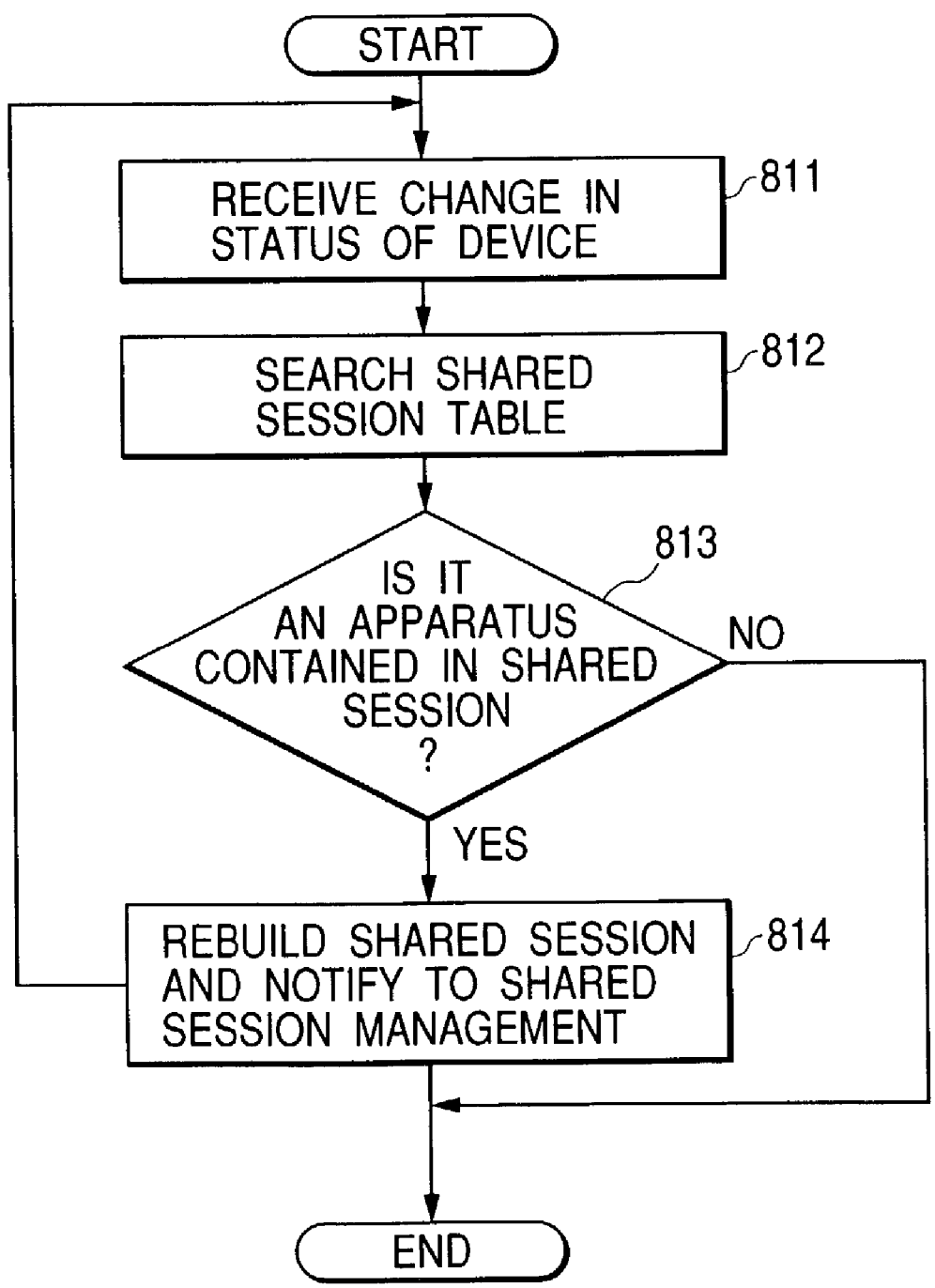
FIG. 8 shows a flow of processing of session re-building of the session building 232.

FIG. 8 is a diagram showing a flow of processing of the session re-building in the session building 232. An event of change in status of apparatus is received from the apparatus status management 231(Step 811), the shared session table 223 is searched, and the shared session in which the apparatus that has undergone the change is registered is extracted (Step 812). Here, the change in status of apparatus means deletion of the apparatus having been registered in the apparatus status table 221 and change in status of task. The session re-building is invoked when change in status occurred in a task that is monitoring an apparatus that opens the access right and accesses of other apparatuses through the shared session. Based on the search results, it is judged whether or not the apparatus has participated any one of the shared sessions (Step 813), and if the apparatus has done, the record of the shared session in the shared session table 223 is updated and the record of the apparatus concerned is deleted. Further, the judgment is notified to the shared session management 233 and the access right is reconfirmed (Step 814). Thus, when the apparatus that opens the access right is disengaged from the shared session, access of the apparatus that uses the open right is stopped.

Figure 9:
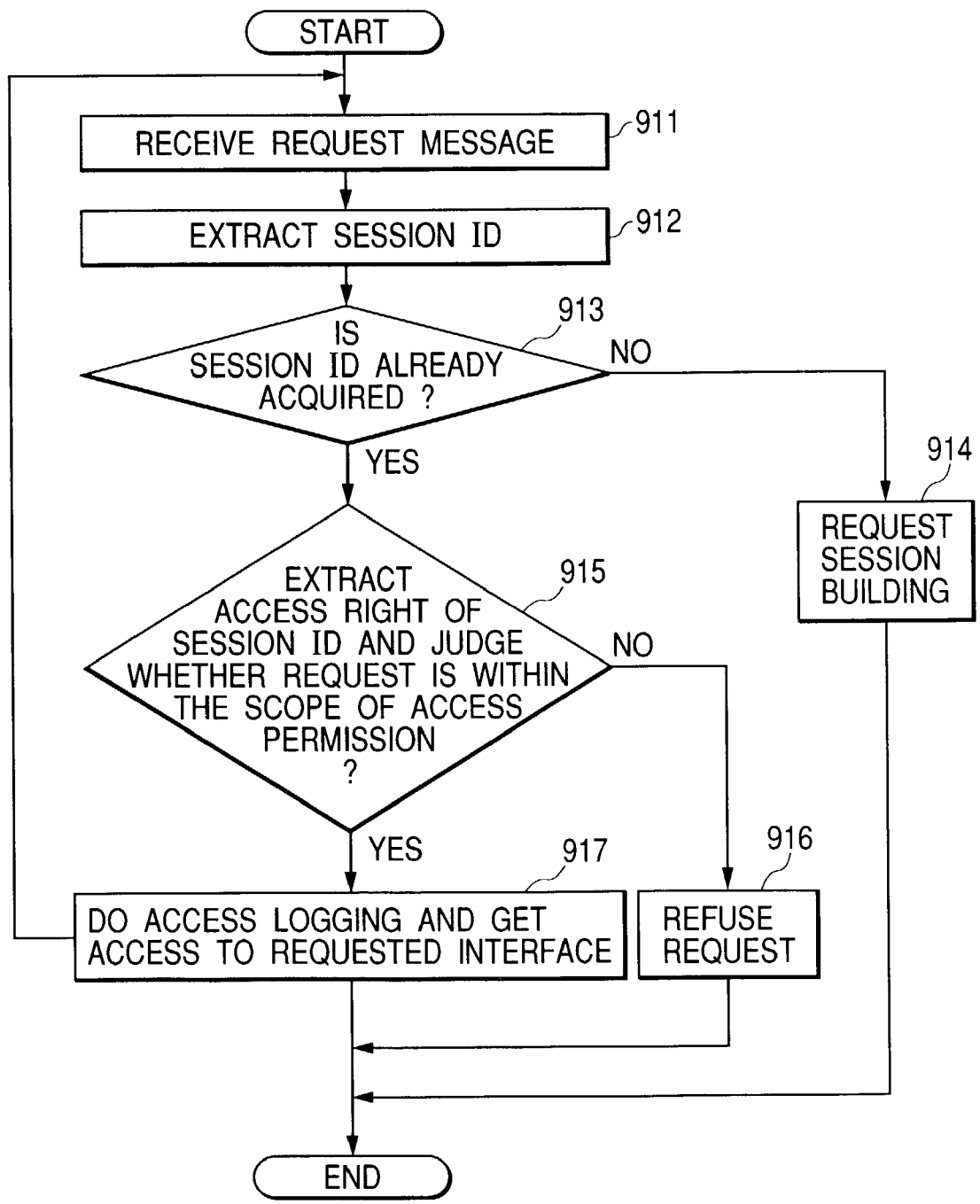
FIG. 9 shows a flow of processing of a shared session management 233.

FIG. 9 is a diagram showing a flow of processing of the shared session management 233. Through the communication 235, the request message from an apparatus on the service using side is received (Step 911), and the shared session ID is extracted from the message (Step 912). It is judged whether or not the shared session ID is successfully extracted, that is, whether or not the shared session ID has already been acquired (Step 913), and then if it has not been extracted yet, the session building 232 is invoked and shared session building is performed (Step 914). If the shared session ID has already been acquired, the shared session table 223 and the access control table 222 are searched to extract the access right in terms of the shared session ID. It is judged whether a request of the received message is within the scope of the access right (Step 915), and then if it is outside the scope, the request is refused (Step 916). If it is within the scope, the access to the requested interface is permitted ad the access is logged (Step 917).

Here, the logging of access undergoes different processing depending on whether the access made by the apparatus is within the scope of the access right originally held by the apparatus, or based on the access right opened by another apparatus. When the access right that was opened by another apparatus in the form of an "OR" type is used, the log is transmitted to the opening source apparatus. If this transmission cannot be done, the apparatus status table 221 and the shared session table 223 are maintained, and the access based on the access right of the apparatus is not permitted assuming that the apparatus is disengaged from the shared session. Further, in accessing the requested interface, the exclusive OR control etc. are preformed using the status 354 of the access control table 222 indicating whether or not the interface concerned is currently used.

By performing the processing explained in the foregoing, it becomes possible to grant the access right to a person who was not registered originally, without making cumbersome registration. Moreover, by constantly monitoring the configuration and statuses of the apparatuses, in cases where recovery of the normal setting is neglected and where connection of the privileged person is interrupted, the access right can be maintained and the unauthorized access can be prevented. Thus, flexible access controlling means that considers a plurality of participants can be provided.

Embodiment 2

In this Embodiment 2, an example where the access control or the provision of services is performed according to conferencing among the service providing apparatuses.

FIG. 10 is a view showing an example of the composition of the shared session table 223 in the second embodiment according to the present invention. The shared session table 223 is constituted of fields 611-615, as with the first embodiment. The fields 611, 612, 615 store, as with the first embodiment, the shared session ID, the individual identifier of the constituent apparatus, the participation type, respectively. In this embodiment, an example of a case where the participation type is "P," that is, the apparatus participates the shared session as the service providing apparatus will be described. The authority publicizing type 613 of participation policy in this embodiment is a field for storing a form in which the authority of its own is opened to other service providing apparatuses. In this field, for example, the following types are stored.

AND: Only if there is an interface of another apparatus, the service is made available.

nAND: Numerical limitation on the above-mentioned type, that is, only if there are n interfaces of other apparatuses, the service is made available.

XOR: The service providing apparatus is made available in an exclusive OR manner with respect to an interface of another apparatus.

The AND type and the nAND type are intended to make the service available, for example, only if there is an apparatus (or apparatuses) having input/output that are used by the application program that opens the interface, and an equipment controlling program and an image/audio output program correspond to these types. The XOR type is for a case where, although the apparatus has an interface of its own as a function of a stand-alone apparatus, exclusive OR needs to be performed due to sharing of the resources etc. Stereo component etc. come under this type. In the public authority 614 of participation policy, authority that is opened in a form specified in the authority publicizing type 613 is stored. The storage is done including other constituent members on which that apparatus depends.

A record 1011 indicates that a member apparatus X participating the session of the session ID1 does so with a participation type "P." that is, as the service provider, with the authority publicizing type "XOR," and with "z.*," that is, the interface of the apparatus X is subjected to exclusive OR control to all interfaces owned by the apparatus z.

A record 1012 indicates similarly that the apparatus Y participating in the session of session ID1 does so with the authority publicizing type "XOR," that is, the interface of the apparatus Y is subjected to exclusive OR control for its full authority.

FIG. 11 is a diagram illustrating a flow of processing of the session building 232 in the second embodiment of the present invention. The relationships between the apparatuses are extracted based on the configuration (Step 1111), and the shared session is built (Step 1112). The relationship between the apparatuses is one that is defined by, for example, sharing of hardware resources and dependency between application programs, and is extracted by using data acquired from the apparatuses that will be explained referring to FIG. 12. Next, the access right to the session is set up (Step 1113). This processing is activated by a certain trigger. The triggering may be done manually or may be done by generating a trigger from a fact that the configuration of the apparatuses has changed.

Figure 12A:
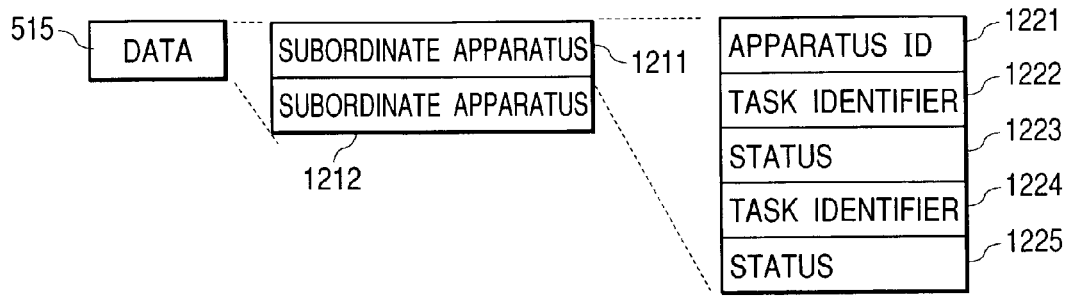
FIG. 12(A) shows an example of the composition of the apparatus information acquisition message in the case where dependency between the apparatuses is formed based on the apparatus IDs in the second embodiment of the present invention.

FIGS. 12(A), (B), and (C) are views each showing an example of the composition of the apparatus information acquisition message in the second embodiment of the present invention. FIG. 12(A) is a view showing an example of the composition of the apparatus information acquisition message in the case where dependency between the apparatuses is formed based on the apparatus IDs. An information list of the subordinate apparatuses 1211-1212 that are managed by the respective apparatuses is put on a data part 515 of the message and is transmitted. Each of the subordinate apparatus information includes the apparatus ID 1221 of the each subordinate apparatus, and sets of task identifiers and statuses 1222-1223 and 1224-1225. This is a case where each apparatus controls collectively peripheral apparatuses connected to the apparatus by a field network, such as USB, and transmits the information. The information of the configuration of these peripheral apparatuses is acquired using a method defined in each field network. Alternatively, the method of apparatus status management processing explained in the first embodiment of the present invention may be used.

Further alternatively, the management may be other than a way whereby a specific apparatus manages its peripheral apparatuses as the subordinate apparatuses: the apparatus information acquired separately may be integrated. At this time, the apparatuses having the same apparatus IDs are treated as the same apparatus even if pieces of information of the configuration were acquired independently and the apparatuses have different network addresses to be used for communication. Even if there is an apparatus whose access right has not been set up beforehand, it becomes possible that the access control is performed using another setting. Among the subordinate apparatuses whose access rights have been acquired in this way, the authority publicizing type of exclusive OR, namely the "XOR" type is specified.

Figure 12B:
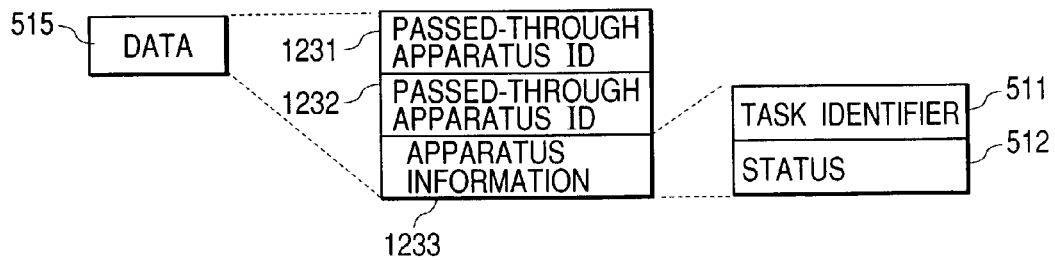
FIG. 12(B) shows an example of the composition of the apparatus information acquisition message in the case where the dependency between the apparatuses is formed using a network structure in the second embodiment of the present invention.

FIG. 12(B) is a view showing an example of the composition of the apparatus information acquisition message in the case where the dependency between the apparatuses is created using a network structure. The data part 515 of the message stores IDs 1231-1232 of the apparatuses that were passed in acquiring information of a target apparatus. This passed-through apparatus ID is easy to extract from routing information of the communication processing. In apparatus information 1233 of the target apparatus, a set of the task identifier 511 and the status 512 are stored, respectively, as with the first embodiment. The reason of using the access path to the apparatus concerned is to use the resources of the passed-through apparatuses when accessing the target apparatus, and such operations correspond to a case where an access is made, for example, via a local ad-hoc network between portable telephones, or the like. In this case, the authority publicizing type 613 of the interface of the target apparatus is set to "AND.apparatus ID," and the public authority 614 takes a form dependent on the passed-through apparatus. That is, only when the approval of the passed-through apparatus is obtained, the access becomes possible.

Figure 12C:
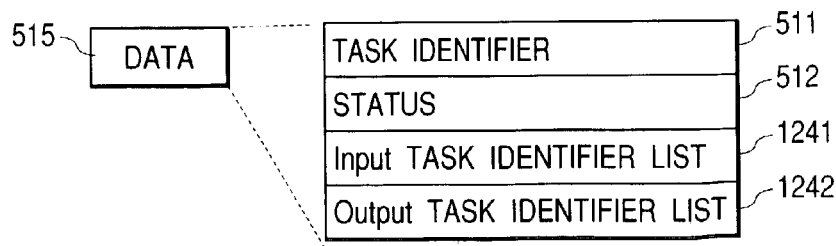
FIG. 12(C) shows an example of the composition of the apparatus information acquisition message in the case where the dependency between the apparatuses is formed using a relationship between application programs in the second embodiment of the present invention.

FIG. 12(C) is an example of the composition of the apparatus information acquisition message in the case where the dependency between the apparatuses is created using a relationship between application programs. In addition to the task identifier 511 and the status 512 explained in the first embodiment, an input task identifier list 1241 indicating a group of application programs that invoke the application program concerned and supply data and an output task identifier list 1242 indicating the application programs that the application program concerned invokes are paired and stored. Such a calling relationship between application programs can be searched using object references of a data receiving side that are held by a data transmitting side, as described in, for example, "Inside CORBA-CORBA and its Application to System Development," (ISBN4-7561-2015-6). Further, in the case where connection is established dynamically through a data identifier as in a Publish/Subscribe model, the relationship can be searched by collecting management information that is held by data input/output management processing of each processing device, as described in JP-A No. 269252/1998. Using information acquired in this way, the dependency between application programs is extracted. This is, for example, a case where a series of applications offer a service together. In this case, the authority publicizing type 613 of the interface of the target apparatus is set to "AND" and the public authority 614 takes a form dependent on an associated task. That is, only when the approval of the passed-though apparatus is obtained, the access becomes possible.

Embodiment 3

In the third embodiment of the present invention, a case where the shared session established among the service users is controlled dispersedly will be described.

Figure 13:
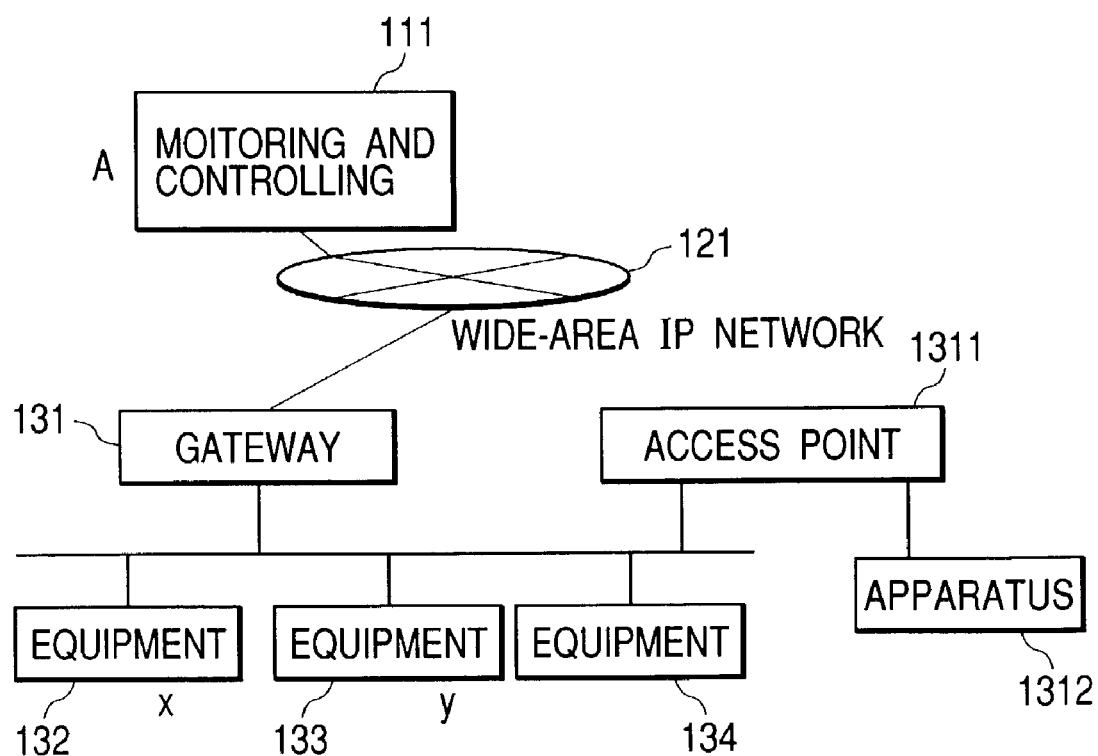
FIG. 13 shows an example of the configuration of a system in a third embodiment of the present invention.

FIG. 13 is a view showing an example of the system configuration in the third embodiment of the present invention. The apparatuses 131-134 constituting a plant control system are the same as the apparatuses explained in FIG. 1. Further, the apparatuses 131-134 are connected to the monitoring and controlling apparatus 111 through the wide-area IP network 121. An apparatus 1312 can access the equipment 132-134 and the gateway 131 through an access point 1311. Here, the apparatus means, for example, a potable terminal of a customer engineer and the access point 1311 is a radio terminal station.

Figure 14:
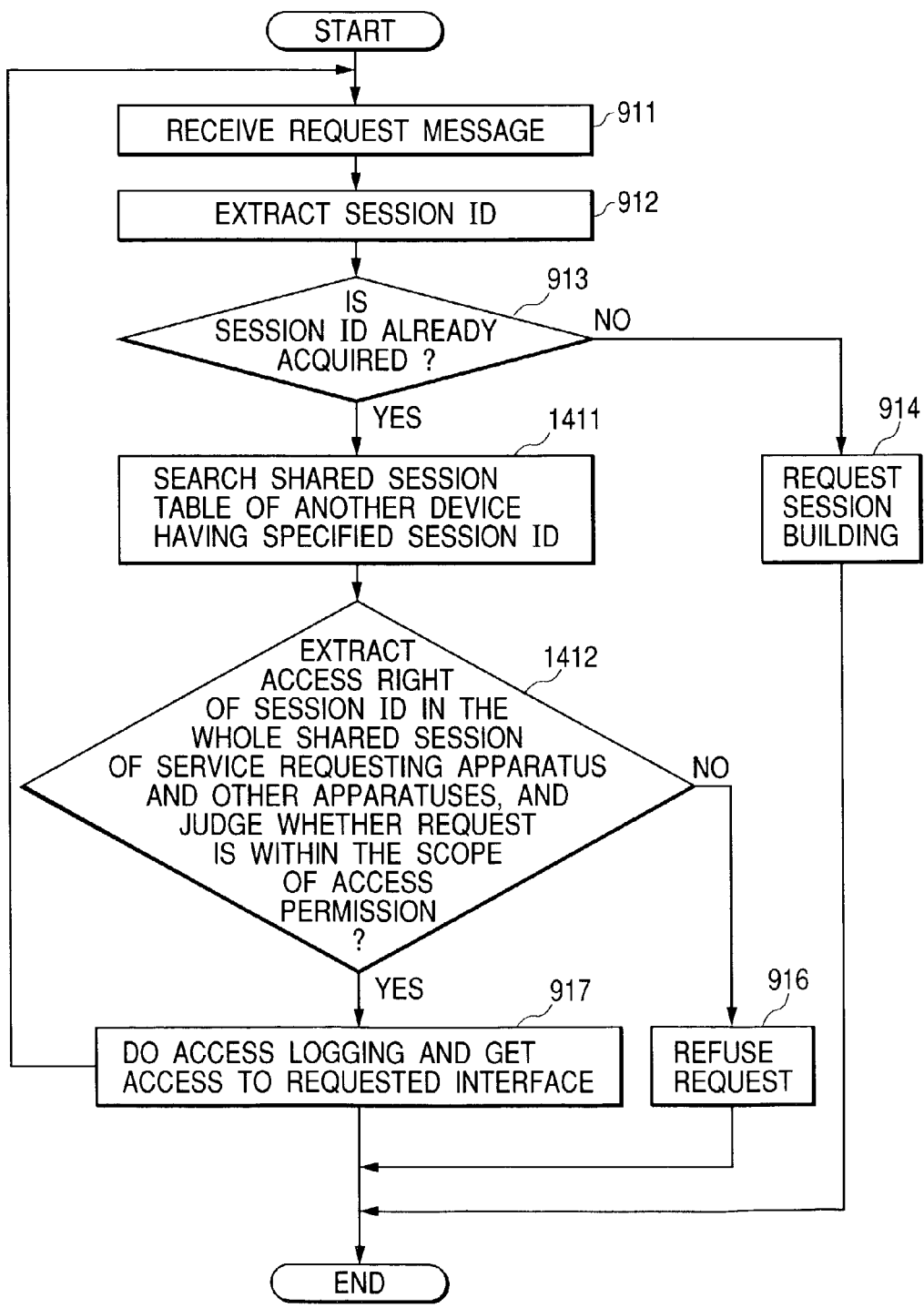
FIG. 14 shows a flow of the shared session management 233 in the third embodiment of the present invention.

FIG. 14 is a view showing a flow of the shared session, management 233 in the third embodiment of the present invention. The steps 911-914 are the same as those of the first embodiment of the present invention. After acquiring the session ID, the service requesting apparatus searches and acquires the shared session table of another apparatus by a method of some sort besides the shared session table 223 and the access control table 222 of its own (Step 1411). To search other apparatuses, for example, a directory server of an apparatus that controls the shared session may be used. Alternatively, the search may be done using multicast communication etc. without using the server. The whole span of the shared session table acquired here is searched to extract the access right in terms of the shared session ID. Further, it is judged whether a request of the received message is within the scope of the access right (Step 1412), and if the request is outside the scope, the request is refused (Step 916). If the request is within the scope, an access to the requested interface is permitted and the access is logged (Step 917).

Here, the access logging is done similarly to the first embodiment of the present invention, but in the case where the access right opened by another apparatus in the "OR" type and the session is controlled by the another apparatus, the log is transmitted to the opening source apparatus via the apparatus that controls the session. In the system configuration of FIG. 13, for example, the access to the equipment 132 from the apparatus 1312 is transmitted to the monitoring and controlling apparatus 111 through the gateway 131.

Embodiment 4

In the fourth embodiment of the present invention, an example of a case where the shared session established among the service providing apparatuses is controlled by distributed apparatuses will be described.

Figure 15:
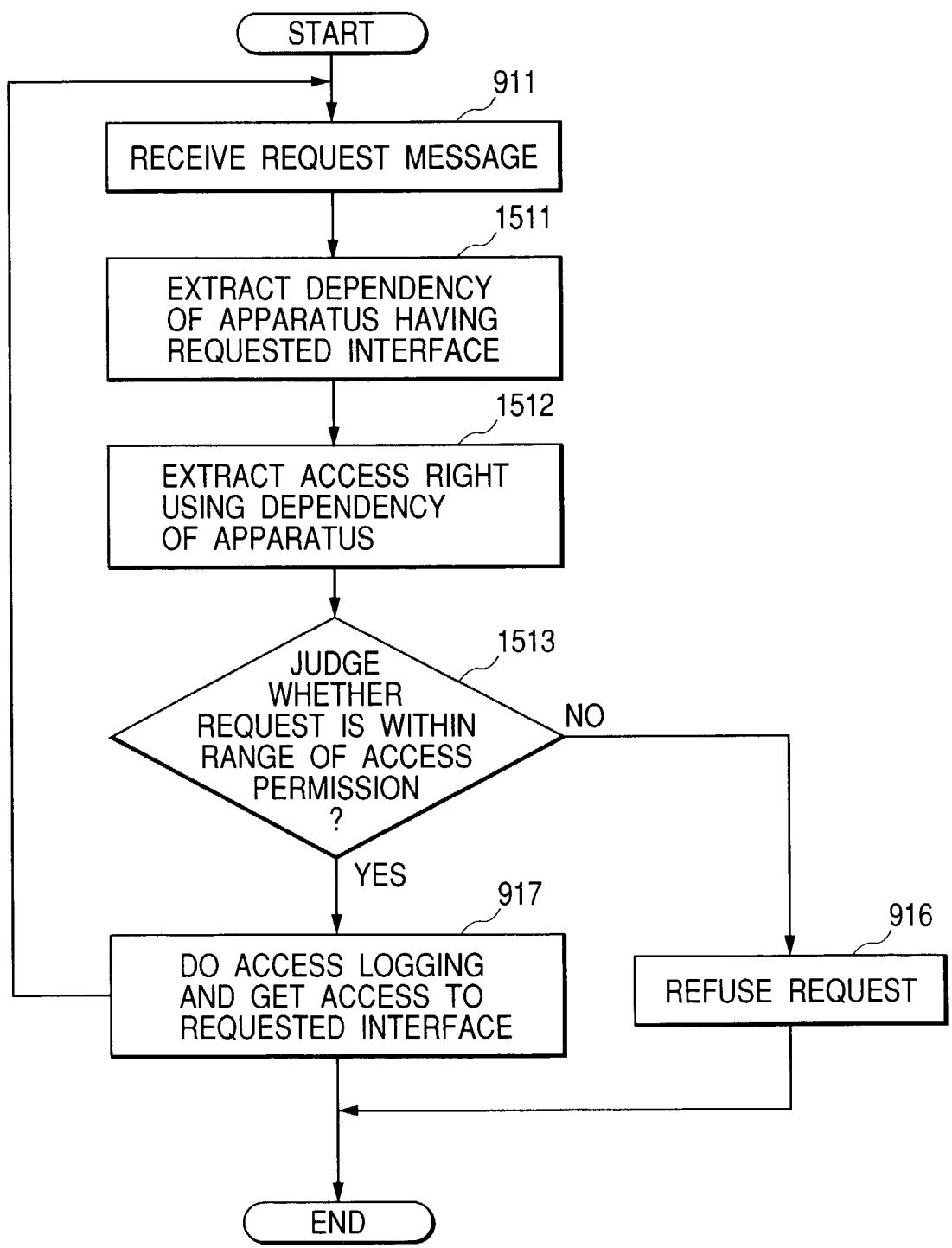
FIG. 15 shows a flow of the shared session management 233 in a fourth embodiment of the present invention.

FIG. 15 is a view showing a flow of the shared session management 233 in the fourth embodiment of the present invention. The step 911 is the same as that of the first embodiment of the present invention. The dependency of the apparatus having a requested interface is extracted (Step 1511), and the access right is extracted using the dependency of the apparatus (Step 1512). Here, the extraction of the dependency of the apparatus and the setting of the access right can be done by the method explained in the second embodiment of the present invention. Subsequently, as with the first embodiment of the present invention, it is judged whether the request is within the scope of the access permission (Step 1513). If it is outside the scope, the request is refused (Step 916); if it is within the scope, the access logging is done, and the access to the requested interface is performed (Step 917).

Note that, although in this embodiment the example in which the dependency between the apparatuses is searched every time the service use is invoked, but in the case where change in the configuration and change in the dependency between application programs occur with low frequency, the session control may be performed as follows: the dependency between the apparatuses is managed beforehand as explained in the first embodiment of the present invention; and the shared session is controlled by a plurality of apparatuses each of which manages the dependency as explained in the third embodiment of the present invention. By providing the steps like these, it becomes possible to get the shared resources under the exclusive OR control and the like even if distributed separate apparatuses are accessed via different apparatuses, respectively.

What is claimed is:

1. An access restriction control device, comprising:
   a communication part for performing data exchange with other apparatuses;
   an apparatus status control part for managing the configuration of other apparatuses which communicate through the communication part and the task status of application programs run on the other apparatuses, and for monitoring the configuration of the other apparatuses and changes in the task status of the application programs;
   a shared session building part for building a shared session shared with the other apparatuses by referencing a shared session table which holds information of the shared session when receiving a request from the other apparatuses; and
   a shared session control part for managing a session which provides the same environment as a shared session,
   wherein the shared session table has an authority publicizing type field stored in a form in which its own authority is available to other apparatuses and a public authority field stored as an authority available to the other apparatuses for each apparatus participating in the shared session, and
   wherein the shared session control part refers to the shared session table when an apparatus participating in the shared session requests the provision of services, and gives access rights to the apparatus based on the value of the public authority field when the condition of participating apparatuses match to the value of the authority publicizing type field, and
   wherein when the configuration of the other apparatuses or the task status of the application programs run on the other apparatuses changes, the shared session building part judges whether or not the apparatus at which the change of the configuration or the task status of the application programs happens, has already participated in any one of shared sessions, updates a record of the shared session in the shared session table if the apparatus at which the change of the configuration or the task status of the application programs happens, has already participated in any one of shared sessions.

2. An access restriction control device according to claim 1, wherein the authority publicizing type includes a type such that the use is permitted to other apparatuses if any one of the apparatuses constituting the same service environment has the access right.

3. An access restriction control device according to claim 1, wherein the control of the access right includes a control of permitting other apparatuses for the use on condition that an apparatus having authority monitors operations corresponding to the authority.

4. An access restriction control apparatus according to claim 1, wherein the control of the access right includes a control of not permitting other apparatuses for the use if all apparatuses constituting the same service environment do not have the same authority.

5. An access restriction control device according to claim 1, wherein the control of the access right includes a control of restricting the use if there exists any other apparatus.

6. An access restriction control method according to claim 1, wherein the apparatus is an apparatus for issuing a request by utilizing the same interface.

7. An access restriction control method according to claim 1, wherein a control of the access right is a control whereby the use is not permitted if all apparatuses do not have the same right.

8. An access restriction control method according to claim 1, wherein the control of the access right is a control whereby the use is permitted for other apparatuses if any one of the apparatuses has the access right.

9. An access restriction control method according to claim 1, wherein the control of the access right is a control whereby the use is stopped for the apparatus of said control if there exists any other apparatus.

10. An access restriction control method according to claim 1, wherein the control of the access right is a control whereby the use is permitted for another apparatus on the condition that the apparatus holding the authority monitors an operation corresponding to the authority.

11. An access restriction control method according to claim 1, wherein the apparatuses constituting the system are apparatuses each having the dependency with other apparatuses.

12. An access restriction control method according to claim 11, wherein the dependency of the apparatuses are dependency such that the use is made available only if there exists an interface of another apparatus.

13. An access restriction control method according to claim 11, wherein the dependency of the apparatuses are dependency such that the apparatus is subjected to an exclusive OR control if there is an interface of another apparatus.

14. An access restriction control method according to claim 11, wherein the dependency of the apparatuses is sharing of hardware resources.

15. An access restriction control method according to claim 11, wherein the dependency of the apparatuses is dependency with respect to a communication path.

16. An access restriction control method according to claim 11, wherein the dependency of the apparatuses are dependency with respect to data input/output between application programs.

17. An access restriction control method according to claim 1, wherein the control of the access right is a control whereby the configuration is rebuilt when the apparatuses constituting the system change.

18. An access restriction control method according to claim 1, wherein the control of the access right is a control that is realized by a gateway between systems.

19. An access restriction control method comprising:
a communication step performing data exchange with other apparatuses;
an apparatus status control step managing the configuration of other apparatuses which communicate through the communication part and task status of application programs run on the other apparatuses, and monitoring the configuration of the other apparatuses and change in the task status of the application programs;
a shared session building step building a shared session shared with the other apparatuses by referring a shared session table which holds information of the shared session, when receiving a request from the other apparatuses; and
a shared session control step managing a session which provides the same environment as a shared session,
wherein the shared session table has an authority publicizing type field stored in a form in which its own authority is available to other apparatuses and a public authority field stored as an authority available to the other apparatuses for each apparatus participating in the shared session,
wherein in the shared session control step, the shared session table is referred when an apparatus participating in the shared session requests the provision of services, access rights to the apparatus is given based on the value of the public authority field when the condition of participating apparatuses match to the value of the authority publishing type field, and
wherein when the configuration of the other apparatuses or the task status of the application programs run on the other apparatuses changes, in the shared session building step, it is judged whether or not the apparatus at which the change of the configuration or the task status of the application programs happens, has already participated in any one of shared sessions, a record of the shared session in the shared session table is updated if the apparatus at which the change of the configuration or the task status of the application programs happens, has participated in any one of shared sessions.

20. An access restriction control device according to claim 1, wherein the shared session building part extracts the relationships between the apparatuses based on the configuration of the apparatuses of the service providing side and builds the shared session by the relationships, and wherein the relationships between the apparatuses includes the relation as to sharing of hardware resources of the apparatuses and the dependency relation between application programs run on the apparatuses.

21. An access restriction control device according to claim 1 wherein the shared session building part extracts an interface intended to be accessed by the request when building a shared session shared with the other apparatuses, judges whether or not there is a corresponding resource in the shared session that has already been built by referring the shared session table which holds information of the shared session, adds a record, a set of the request source node and the session in the shared session table if there is the resource, and adds a new record of the shared session in the shared session table if there is not the resource.

22. An access restriction control method according to claim 19, wherein in the shared session building steps, the relationships between the apparatuses based on the configuration of the apparatuses of the service providing side is extracted and the shared session is built by the relationships, and wherein the relationships between the apparatuses includes the relation as to sharing of hardware resources of the apparatuses and the dependency relation between application programs run on the apparatuses.

23. An access restriction control device according to claim 19, wherein in the shared session building step an interface intended to be accessed by the request is extracted when building a shared session shared with the other apparatuses; it is judged whether or not there is a corresponding resource in the shared session that has already been built by referring the shared session table which holds information of the shared session; a record, a set of the request source node and the session in the shared session table is added if there is the resource; and a new record of the shared session in the shared session table is added if there is not the resource.

* * * * *